United States Patent [19]
Petrus

[11] 3,914,832
[45] Oct. 28, 1975

[54] WORM GEAR CLAMPING APPARATUS

[75] Inventor: Stephen Petrus, Parma, Ohio

[73] Assignee: Eaton Corporation, Cleveland, Ohio

[22] Filed: Jan. 9, 1975

[21] Appl. No.: 539,905

[52] U.S. Cl. ............................................. 24/274 R
[51] Int. Cl.² ........................................ B65D 63/02
[58] Field of Search ............ 24/274 R, 16 PB, 16 R, 24/274 WB, 274 P

[56] References Cited
UNITED STATES PATENTS

| | | | |
|---|---|---|---|
| 2,990,599 | 7/1961 | Gustavsson | 24/274 R |
| 3,371,392 | 3/1968 | Rueckheim | 24/274 R |
| 3,414,943 | 12/1968 | Hattori | 24/16 R X |
| 3,528,142 | 9/1970 | Lodholm | 24/274 |
| 3,581,347 | 6/1971 | Verspieren | 24/16 PB |
| 3,708,835 | 1/1973 | Bienz | 24/16 PB |
| 3,755,859 | 9/1973 | Solari | 24/16 PB X |
| 3,840,018 | 10/1974 | Heifetz | 24/274 R X |

Primary Examiner—Donald A. Griffin
Attorney, Agent, or Firm—Teagno & Toddy

[57] ABSTRACT

A worm gear clamping apparatus which utilizes a molded, one-piece worm gear drive head and a flexible attachable strap. As molded, the worm gear drive head is composed of a base, a cover, and a worm gear screw which are flexibly connected permitting the positioning and interlocking of these components relative to one another during assembly of the worm gear drive head. In one embodiment, the clamping apparatus utilizes a strap integrally molded to the worm gear drive head, while in the second embodiment the strap is connected to the worm gear drive head by independent means.

17 Claims, 13 Drawing Figures

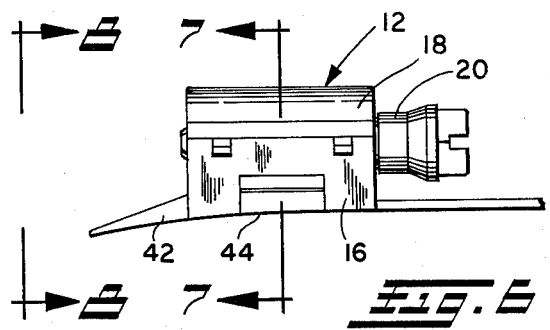
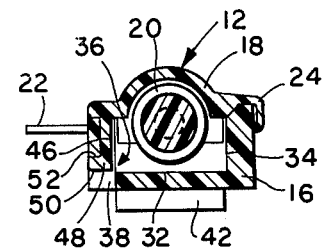
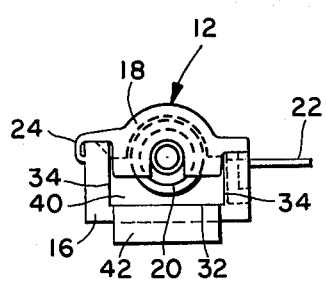
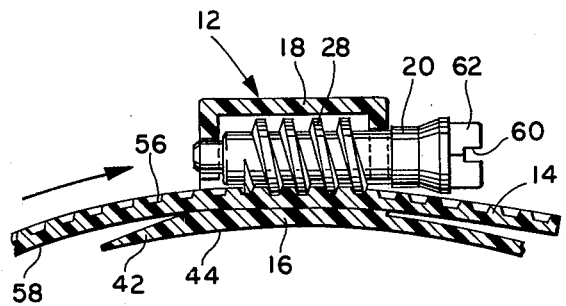
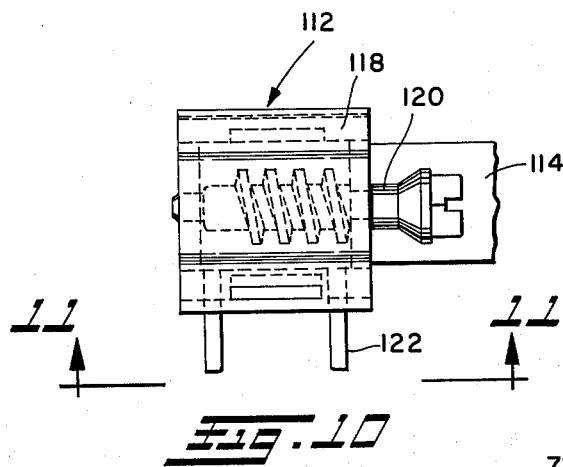
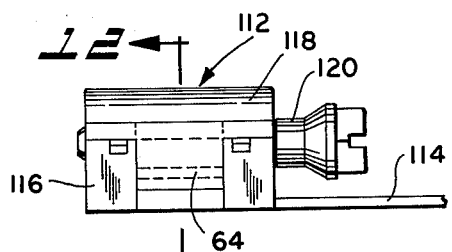
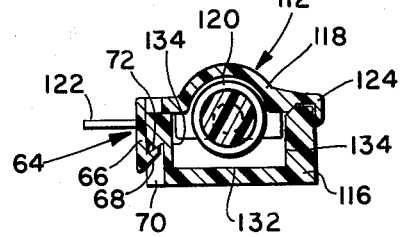
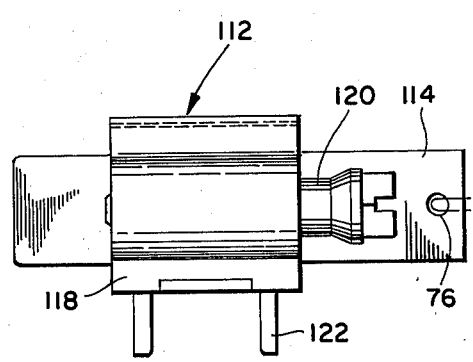

WORM GEAR CLAMPING APPARATUS

BACKGROUND OF THE INVENTION

1. Field of the Invention

This invention relates generally to a clamping device, and more particularly to a worm gear type clamping device utilizing a molded, one-piece worm gear drive head construction.

2. Description of the Prior Art

Worm gear clamping devices, such as those disclosed in U.S. Pat. Nos. 3,371,392 and 3,521,334, are widely used since they offer many advantages over spring type and other fixed diameter clamping devices. For example, they are more convenient to use than spring type clamping devices, do not require special tools for installation and removal as do spring type clamping devices, and allow adjustment of the clamping force. However, some disadvantages also exist when worm gear clamping devices of the prior art are used. One of the most apparent problems resulting from the use of such clamping devices is corrosion since these devices are usually composed of metallic components. Such corrosion makes removal of these worm gear clamping devices very difficult. Additionally, numerous components are usually required making these clamping devices expensive to produce and/or assemble. Besides being expensive to produce and/or assemble, these worm gear clamping devices are expensive to stock in inventory since a particular clamping device can be used only for a small range of clamping diameters due to the rigidity of the metallic strap. If a significantly different clamping diameter is required, another worm gear clamping device having a strap of the appropriate length is required. And lastly, even though the clamping force is adjustable, it is possible to overtighten these worm gear clamping devices causing the article to which it is attached to be cracked or cut as a result of the excessive clamping force.

Because of the aforementioned problems associated with the presently available worm gear clamping devices, it has become desirable to find a low cost, corrosion resistant worm gear clamping device that cannot be overtightened, is composed of a minimum of components, and can be used for a wide range of clamping diameters.

SUMMARY OF THE INVENTION

The present invention provides a solution to the aforementioned problems of corrosion, overtightening, multiplicity of parts, and high production and/or assembly costs. Additionally, the worm gear clamping device disclosed can be used for a wide range of clamping diameters thus increasing its versatility and decreasing inventory costs.

A molded, one-piece worm gear drive head and a molded strap for variable diameter clamping are disclosed. In one embodiment of the invention, the worm gear drive head, including all the components thereof, and the strap are molded as a one-piece construction. In another embodiment of the invention, the complete worm gear drive head and the strap are molded as two separate one-piece constructions. In both of these embodiments, the components of the worm gear drive head are molded in unassembled form and include a base member, a cover member, and a worm gear screw. Both the cover member and the worm gear screw are flexibly attached to the base member by webs to assist the assembly operation.

Assembly of the worm gear drive head requires folding the worm gear screw inwardly about the base member so as to be adjacent the interior of the base member, and then folding the cover member in the opposite direction inwardly about the base member so as to capture the worm gear screw and provide a slot between the cover member and the base member. The resulting worm gear drive head is held together by a latch molded on the cover member which engages a recess on the base member. In one embodiment of the invention, the latch is positioned to engage a recess on the outer surface of the base member, whereas in another embodiment the latch engages a recess provided on the inner wall of the base member.

The strap, which has axially extending partial threads molded thereon, is formed into a circular configuration and inserted into the slot in the worm gear head causing the partial threads to engage the worm gear screw. By rotation of the worm gear screw, the clamping diameter can be varied to accommodate articles of various sizes for applying a clamping force thereto.

Inasmuch as this worm gear clamping device is manufactured from a non-metallic material, corrosion does not exist. Additionally, since the worm gear drive head is molded as a one-piece construction, assembly can be performed by the customer, thus reducing production and/or assembly costs. Inventory costs will also be reduced since the resulting molded clamping devices can accommodate a wider range of clamping diameters inasmuch as the molded strap is more flexible than the metallic strap used for present worm gear clamping devices. These inventory costs can be further reduced if the worm gear drive head is molded separately from the strap, thus permitting the same drive head to be used with straps of various lengths. And lastly, the molded worm gear drive head prevents overtightening since the worm gear screw and the partial threads molded on the strap can be designed to "skip" without stripping the threads when a certain torque is reached. Thus, this invention overcomes many of the problems associated with worm gear clamping devices presently available.

Accordingly, it is an object of the present invention to provide a new and improved worm gear clamping device.

Another object of the present invention is to provide a worm gear clamping device having a molded one-piece worm gear drive head.

A further object of the present invention is to provide a worm gear clamping device that is composed of a minimum of components and is inexpensive to produce.

Still another object of the present invention is to provide a worm gear clamping device that can be used for a wide range of clamping diameters.

A further object of the present invention is to provide a worm gear clamping device that cannot be overtightened.

Another object of the present invention is to provide a worm gear clamping device that is corrosion resistant.

These and other objects and advantages of the present invention will become apparent from the following detailed description taken in connection with the accompanying drawings.

BRIEF DESCRIPTION OF DRAWINGS

FIG. 3 is a partial side elevation view of the assembled worm gear clamping device encircling a hose or the like.

FIG. 6 is a side elevation view of the embodiment shown in FIG. 5.

FIG. 7 is a cross-sectional view taken along section indicating lines 7—7 of FIG. 6 showing the latch configuration used for the embodiment shown in FIG. 5.

FIG. 8 is a front elevation view of the embodiment shown in FIG. 5.

FIG. 9 is a side cross-sectional view of the worm gear drive head showing the engagement of the worm gear screw with the threads molded on the strap.

FIG. 10 is a top view of another embodiment of the worm gear drive head in the completely assembled condition.

FIG. 11 is a side elevation view of the embodiment shown in FIG. 10.

FIG. 12 is a cross-sectional view taken along section indicating lines 12—12 of FIG. 11 showing the latch configuration for the embodiment shown in FIG. 10.

FIG. 13 is a top view of the one-piece worm gear drive head in the assembled position with a detachable strap.

DESCRIPTION OF THE PREFERRED EMBODIMENT

Figure 1:
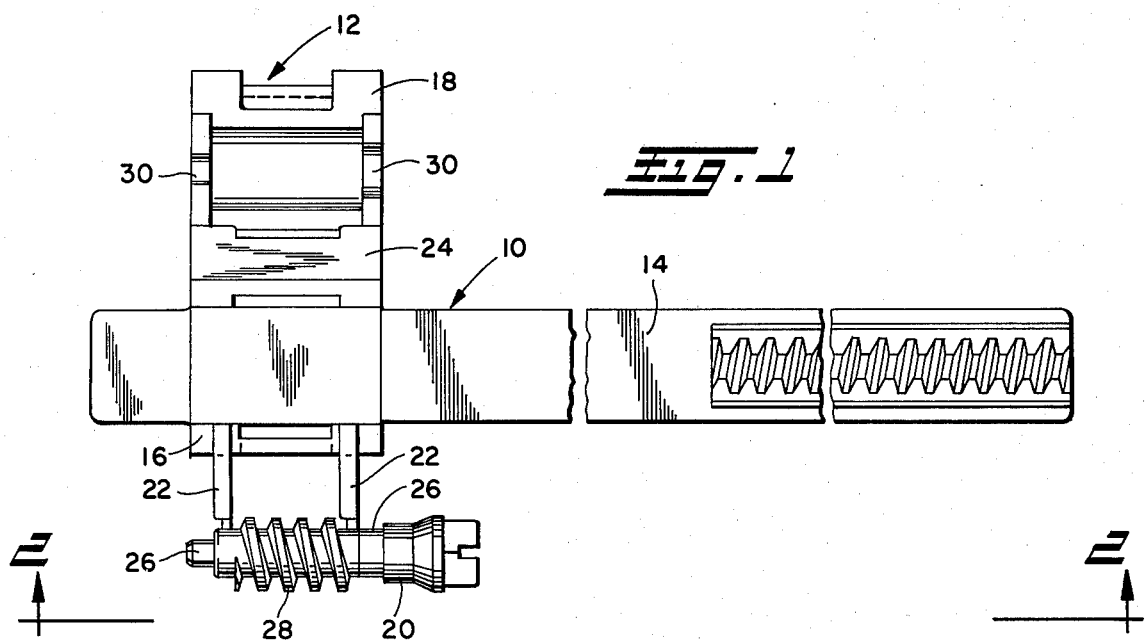
FIG. 1 is a top view of the one-piece worm gear drive head and strap in the "as molded" condition.
Figure 2:
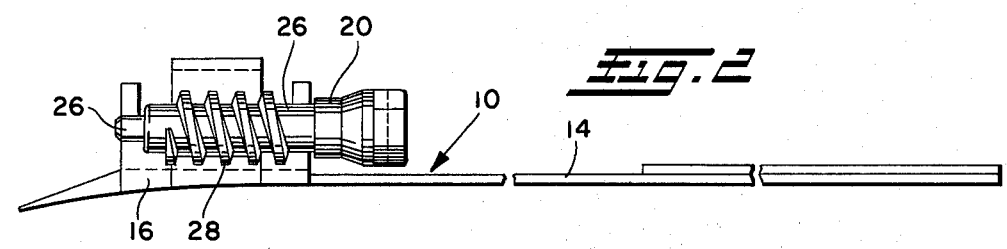
FIG. 2 is a side elevation view of the embodiment shown in FIG. 1.
Figure 3:
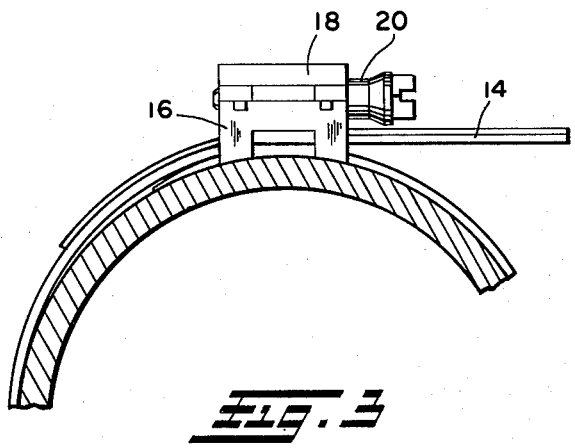

Referring now to FIGS. 1 and 2, the worm gear clamping device 10 is shown in its as-molded condition and as a one-piece configuration. It should be noted that the term "worm gearing" as used herein shall include all types of rotatable externally threaded members that engage correspondingly threaded axially extended members and transmit an axial movement to the axially extended members upon rotation of the threaded member. The clamping device 10 is composed of a worm gear drive head 12 and a strap 14 which is received in the drive head 12 when the clamping device is in its fully assembled condition, as shown in FIG. 3. As shown in FIGS. 1 and 2, worm gear drive head 12 is composed of a base member 16, a cover member 18, and a worm gear screw 20 which, for assembly, are positioned relative to one another and then interlocked to form worm gear drive head 12. To assist assembly, worm gear screw 20 is connected to base member 16 by flexible frangible webs 22 and cover member 18 is connected to base member 16 by flexible web 24 which is oppositely disposed from flexible frangible webs 22. Webs 22 and 24 permit movement of cover member 18 and worm gear screw 20 relative to base member 16 and relative to one another to accomplish proper positioning of these components for assembly of worm gear drive head 12. To further assist assembly, journals 26 are provided outboard the external threads 28 on worm gear screw 20, and bearing surfaces 30 are molded on the interior surface of cover member 18.

Figure 4:
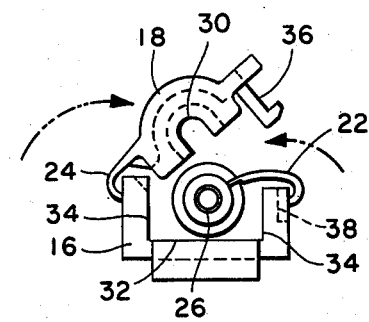
FIG. 4 is a front elevation view of the worm gear device head in partially assembled form illustrating the operations required for assembly.

During assembly of the worm gear drive head 12, as shown in FIG. 4, the worm gear screw 20 is folded inwardly about base member 16 so as to be parallel to and adjacent the bottom 32 of base member 16. Webs 22 are of a predetermined length so that worm gear screw 20 will also be equidistant and parallel to inner walls 34 of base member 16 after worm gear screw 20 has been folded about base member 16. In this position, the journals 26 provided on worm gear screw 20 are aligned to be received in bearing surfaces 30 provided in cover member 18. Cover member 18 is then folded in the opposite direction about base member 16 and bearing surfaces 30 engage journals 26 insuring that worm gear screw 20 remains in proper alignment. When cover member 18 is in its fully folded position, a latch 36 provided thereon engages a recess 38 provided in base member 16 interlocking the base member 16, cover member 18 and worm gear screw 20 to form a fully assembled worm gear drive head 12.

Figure 5:
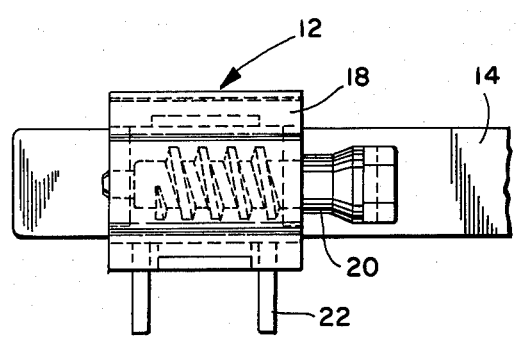
FIG. 5 is a top view of the worm gear drive head in the completely assembled condition.

Referring now to FIGS. 5, 6 and 8, one embodiment of a fully assembled worm gear drive head 12 is shown. As illustrated in FIG. 8, when the worm gear drive head is assembled, a slot 40 bounded by the bottom 32 and inner walls 34 of base member 16, the inner surface of cover member 18, and worm gear screw 20 is formed. Strap 14 is then received into slot 40 to complete assembly of the worm gear clamping device, as will be explained later.

As shown in FIG. 6, a lead-in ramp 42 is provided adjacent the end of the base member 16 to assist the insertion of strap 14 into slot 40 and to provide the proper alignment of strap 14 relative to base member 16 as strap 14 is being advanced through the worm gear drive head 12. A concave surface 44 is also provided on the underside of base member 16 so that the resulting configuration of the worm gear drive head and the strap is more nearly circular to more evenly distribute the clamping force applied to the article being clamped. Such an even distribution of clamping force prevents cracking, cutting, or rupturing the clamped article in the area directly beneath the worm gear drive head.

The same embodiment of the worm gear drive head illustrated in FIGS. 5, 6 and 8 is shown in FIG. 7, however, the drive head is illustrated in cross-section to shown the configuration of latch 36 and its engagement with recess 38. In this embodiment of the invention, the latch 36 is L-shaped and is composed of a leg member 46 with a lip 48 at one end thereof. The other end of leg member 46 is molded to cover member 18. Leg member 46 is perpendicular to the plane of cover member 18 and adjacent the inner walls 34 of base member 16 when the worm gear drive head is in a fully assembled condition. Lip 48 is perpendicular to the plane of leg member 46 and is parallel to the plane of cover member 18 but is directed outward from the central axis thereof. To assist insertion of latch 36 into recess 38, a rounded surface 50 is provided on lip 48 permitting sliding engagement of lip 48 with the inner walls 34 of base member 16. After insertion of latch 36 into recess 38, lip 48 engages locking surface 52 formed by recess 38 to interlock the fully assembled worm gear drive head 12. It is understood that worm gear drive head 12 could also be interlocked if leg member 46 was molded to base member 16 and recess 38 was provided in cover member 18. With either configuration, worm gear drive head 12, when interlocked, will not open from the normal forces which exist within the worm gear drive head 12 when being used.

Referring now to FIG. 9, a cross-sectional view of a completely assembled worm gear clamping device showing the worm gear drive head 12 and the engagement of worm gear screw 20 with strap 14 is illustrated. Strap 14 is provided with axially extending threads 56 on one side thereof for a portion of its length. The pitch of threads 56 coincides with the pitch of threads 28 present on worm gear screw 20. For assembly of the clamping device, the strap 14 is formed into a generally circular configuration with threads 56 on the outer circumference thereof. The end of the strap 14 is then brought into position to be fed into the worm gear drive head 12 and is placed on lead-in ramp 42 so that the smooth side 58 of strap 14 is in contact with lead-in ramp 42. The end of the strap having threads 56 molded thereon is then inserted into slot 40 and threads 56 contact threads 28 provided on worm gear screw 20. By rotating worm gear screw 20, frangible webs 22 are broken and threads 28 provided on worm gear screw 20 engage threads 56 on strap 14 and advance strap 14 through the worm gear drive head 12, thus decreasing the diameter of the generally circular configuration of strap 14 and providing a clamping force on the article encircled strap 14. To assist rotation, worm gear screw 20 is provided with a slotted head 60 for insertion of a screwdriver. Slotted head 60 also has a hexagonal configuration 62 to accommodate a wrench for tightening worm gear screw 20. Head 60 may also be formed in the shape of a wing-nut or the like to assist rotation.

Another embodiment of a fully assembled worm gear drive head 12 is shown in FIGS. 10 and 11. This embodiment differs from the aforementioned embodiment primarily in the configuration of the latch and the placement of the recess provided to receive the latch. Those parts which are similar to those previously enumerated are given like numerals with a "1" prefixed thereto and will not be reviewed further.

In this embodiment of the invention, as shown in FIG. 12, the latch 64 is L-shaped and is composed of a leg member 66 with a lip 68 at one end thereof. The other end of leg member 66 is molded to cover member 118. Leg member 66 is perpendicular to the plane of cover member 118 and adjacent the outer surface of base member 116 when the worm gear drive head is in a fully assembled condition. Lip 68 is positioned at an acute angle relative to leg 66 and is directed inwardly toward the central axis of cover member 118. A recess 70 is provided on the outer surface of base member 116 to receive lip 68. When lip 68 is received in recess 70, lip 68 engages locking surface 72 formed by recess 70 to interlock the assembled worm gear drive head 112. As with the previous embodiment, interlocking could also be achieved if leg member 66 was molded to base member 116 and recess 70 was provided in cover member 118.

Another embodiment of the invention is shown in FIG. 13. This embodiment differs from all of the previous embodiments in that the strap is detachable from the worm gear drive head, thus permitting the use of the drive head with various strap lengths. Again those parts which are similar to those previously enumerated are given like numerals with a "1" prefixed thereto and will not be reviewed further.

In this embodiment of the invention, the strap 72 is molded separately from the worm gear drive head 112. To assist connection of strap 72 to worm gear drive head 112, an aperture 74 is provided in strap 72 and an aperture 76 is placed adjacent worm gear drive head 112. A connecting device, shown as dotted lines, is received in apertures 74 and 76 to connect worm gear drive head 112 to strap 72. It should be noted that the connecting device may be integrally molded to either the worm gear drive head 112 or strap 72 thus eliminating the need for apertures 74 and 76 respectively. With either configuration, straps of various lengths can be used making the worm gear clamping device usable for a very wide range of clamping diameters, thus increasing its versatility.

One feature that is present with all of the aforementioned embodiments is the ability of the worm gear drive head to "skip" when, during tightening, the clamping device reaches a predetermined clamping force, thus preventing the cracking or rupture of the article being clamped or the stripping of threaded surfaces. This ability to skip is caused by the deformation of these threaded surfaces under a high level of stress. Such deformation is not damaging to the threaded surfaces and offers an advantage to the user.

Variations of the present invention will be apparent to those having ordinary skill in the art and the invention is limited only by the spirit and scope of the following claims.

I claim:

1. A flexible, encircling, variable circumference, clamping apparatus comprising:
   a molded, one-piece worm gear drive head and a flexible molded strap attachable to said worm gear drive head;
   said worm gear drive head comprising:
   a base member having a smooth interior surface and a recess molded thereon, a cover member connected to said base member by means of a flexible web member and having a latch molded thereon and a plurality of bearing surfaces molded therein, and a threaded member connected to said base member by means of flexible frangible web members and having threads formed on a portion of its length and journals outboard the ends of said threads, said threaded member also including means to rotate said threaded member at one end thereof; and
   said strap having a smooth side and a threaded side oppositely disposed from said smooth side, said threaded side having a plurality of axially extending matable worm gear threads at one end thereof, the other end of said strap being attachable to said worm gear drive head.

2. A flexible, encircling, variable circumference, clamping apparatus as defined in claim 1 wherein said cover member and said threaded member have a first molded position and a second assembled position wherein said threaded member is folded about said base member to be oppositely disposed from said base member and said cover member is folded about said base member to be oppositely disposed from said base member permitting said journals on said threaded member to engage said bearing surfaces provided on said cover member and permitting said latch to engage said recess in said base member, said folding and engagement of said cover member and said threaded member relative to said base member forming a slot between said smooth interior surface of said base member and said threaded member to receive said strap, said strap having a first molded position and a second assembled position wherein said strap is formed into a generally circular configuration having said threaded side on the outer circumference thereof, said strap being received in said slot permitting said smooth side of said strap to slidingly contact said smooth interior surface of said base member and permitting said axially extending worm gear threads on said strap to engage said threaded member allowing the diameter of said generally circular configuration to be selectively varied by rotation of said threaded member.

3. A flexible, encircling, varible circumference, clamping apparatus as defined in claim 2, wherein said recess on said base member is molded on the outer surface thereof.

4. A flexible, encircling, variable circumference, clamping apparatus as defined in claim 2, wherein said recess on said base member is molded on the interior wall of said base member.

5. A flexible, encircling, variable circumference, clamping apparatus as defined in claim 2, wherein said base member has a ramp shaped section molded thereto at one end thereof to form a leading surface to assist insertion of said strap in said slot and engagement of said axially extending worm gear threads with said threaded member.

6. A flexible, encircling, variable circumference, clamping apparatus as defined in claim 2, wherein said base member has a generally concave surface on the underside thereof to permit firm seating of said worm gear drive head on the article being clamped.

7. A flexible, encircling, variable circumference, clamping apparatus as defined in claim 2, wherein said threaded member is provided with a slotted head at one end thereof to assist rotation of said threaded member to vary said diameter of said generally circular configuration of said strap.

8. A flexible, encircling, variable circumference, clamping apparatus as defined in claim 2, wherein said threaded member is provided with a hexagonal head at one end thereof to assist rotation of said threaded member to vary said diameter of said generally circular configuration of said strap.

9. A flexible, encircling, variable circumference, clamping apparatus as defined in claim 1, wherein said strap is integrally molded to said base member.

10. A flexible, encircling, variable circumference, clamping apparatus as defined in claim 1, wherein said strap is operatively connected to said base member.

11. A flexible, encircling, variable circumference, clamping apparatus comprising:
a molded, one-piece worm gear drive head and a flexible strap attachable to said worm gear drive head; said worm gear drive head comprising a U-shaped base member having a smooth interior surface with a recess provided on one wall thereof and also having a generally concave surface on the underside thereof, said concave surface extending to a ramp shaped section molded to one end of said base member, a cover member connected to said base member by means of a flexible web member and having a plurality of bearing surfaces molded therein and a latch molded thereon, and a threaded member connected to said base member by means of flexible frangible web members and having threads formed on a portion of its length and journals outboard the ends of said threads, said threaded member also having a hexagonal slotted head at one end thereof to assist rotation of said threaded member, said cover member and said threaded member having a first molded position and a second assembled position wherein said threaded member is folded about said base member to be oppositely disposed from said base member and said cover member is folded about said base member to be oppositely disposed from said base member permitting said journals on said threaded member to engage said bearing surfaces provided on said cover member and permitting said latch to engage said recess provided in said base member, said folding and engagement of said cover member and said threaded member relative to said base member forming a slot between said smooth interior surface of said base member and said threaded member to receive said flexible strap, said ramp shaped section forming a leading surface to assist insertion of said strap in said slot and engagement of said strap with said threaded member.

12. A flexible, encircling, variable circumference, clamping apparatus as defined in claim 11, wherein one side of said strap has a plurality of axially extended matable worm gear threads at one end thereof, the other end of said strap being attachable to said worm gear drive head.

13. A flexible, encircling, variable circumference, clamping apparatus as defined in claim 12, wherein said strap is integrally molded to said base member.

14. A flexible, encircling, variable circumference, clamping apparatus as defined in claim 12, wherein said strap is operatively connected to said base member.

15. A molded, one-piece worm gear drive head comprising a U-shaped base member having a smooth interior surface and a recess molded thereon, a cover member connected to said base member by means of a flexible web member and having a plurality of bearing surfaces molded therein and a latch molded thereon, and a threaded member connected to said base member by means of flexible frangible web members and having threads formed on a portion of its length and journals outboard the ends of said threads, said threaded member also having a hexagonal slotted head at one end thereof to assist rotation of said threaded member, said cover member and said threaded member having a first molded position and a second assembled position wherein said threaded member is folded about said base member to be oppositely disposed from said base member and said cover member is folded about said base member to be oppositely disposed from said base member permitting said journals on said threaded member to engage said bearing surfaces provided on said cover member and permitting said latch to engage said recess in said base member, said folding and engagement of said cover member and said threaded member relative to said base member forming a slot between said smooth interior surface of said base member and said threaded member, said slot adapted to receive a flexible strap.

16. A molded, one-piece worm gear drive head as defined in claim 15, wherein said recess on said base member is molded on the interior wall of said base member.

17. A molded, one-piece worm gear drive head as defined in claim 15, wherein said base member has a generally concave surface on the underside thereof, said concave surface extending to a ramp shaped section molded to one end of said base member.

* * * * *